United States Patent [19]

Dorn

[11] 4,244,541

[45] Jan. 13, 1981

[54] DUAL CAM CONTROL MECHANISM FOR COORDINATED DEPLOYMENT AND RETRACTION OF AN AIR-CRAFT'S LEADING AND TRAILING EDGE WING FLAPS

[75] Inventor: Rupert I. Dorn, Seattle, Wash.

[73] Assignee: The Boeing Company, Seattle, Wash.

[21] Appl. No.: 64

[22] Filed: Jan. 2, 1979

[51] Int. Cl.³ .............................................. B64C 13/32
[52] U.S. Cl. ................................... 244/221; 244/211; 74/471 R
[58] Field of Search ............. 244/210, 211, 213, 75 R, 244/221, 224, 225, 226, 230, 232, 233, 234; 74/471 R, 491, 533, 534

[56] References Cited

U.S. PATENT DOCUMENTS

| | | | |
|---|---|---|---|
| 2,814,957 | 12/1957 | Mitrovich | 74/471 R X |
| 3,067,628 | 12/1962 | Haworth et al. | 74/471 R X |
| 3,166,272 | 1/1965 | Liddell et al. | 74/471 R X |
| 3,736,810 | 6/1973 | Fernandez | 74/471 R X |
| 4,071,208 | 1/1978 | Baker | 74/471 R X |
| 4,154,415 | 5/1979 | Harris et al. | 74/471 R X |
| 4,171,113 | 10/1979 | Townsend | 74/471 R X |

*Primary Examiner*—Galen L. Barefoot

*Attorney, Agent, or Firm*—Christensen, O'Connor, Johnson & Kindness

[57] ABSTRACT

In the disclosed mechanism a primary position control cam has first and second camming surfaces for cooperating with separate followers that in turn act through a hydraulic subsystem to position the leading and trailing edge wing flaps in response to a single, pilot operated control lever. A secondary cam also having first and second camming surfaces correspondingly shaped to those of the primary cam, is slaved to the actual, hydraulically effected movement of the trailing edge flaps. Cooperating with the first surface of the secondary cam is a feedback follower for providing a mechanical feedback signal that assists the primary cam and the associated hydraulics in positioning the trailing edge flaps. An override follower cooperates with the second camming surface on the secondary cam and mechanically overrides the ability of the primary cam's second surface follower to position the leading edge flaps under certain conditions, so as to ensure a predetermined, aerodynamically critical sequencing of the hydraulically effected movements of the leading and trailing edge flaps as they seek the positions commanded by the single, pilot operated lever.

13 Claims, 5 Drawing Figures

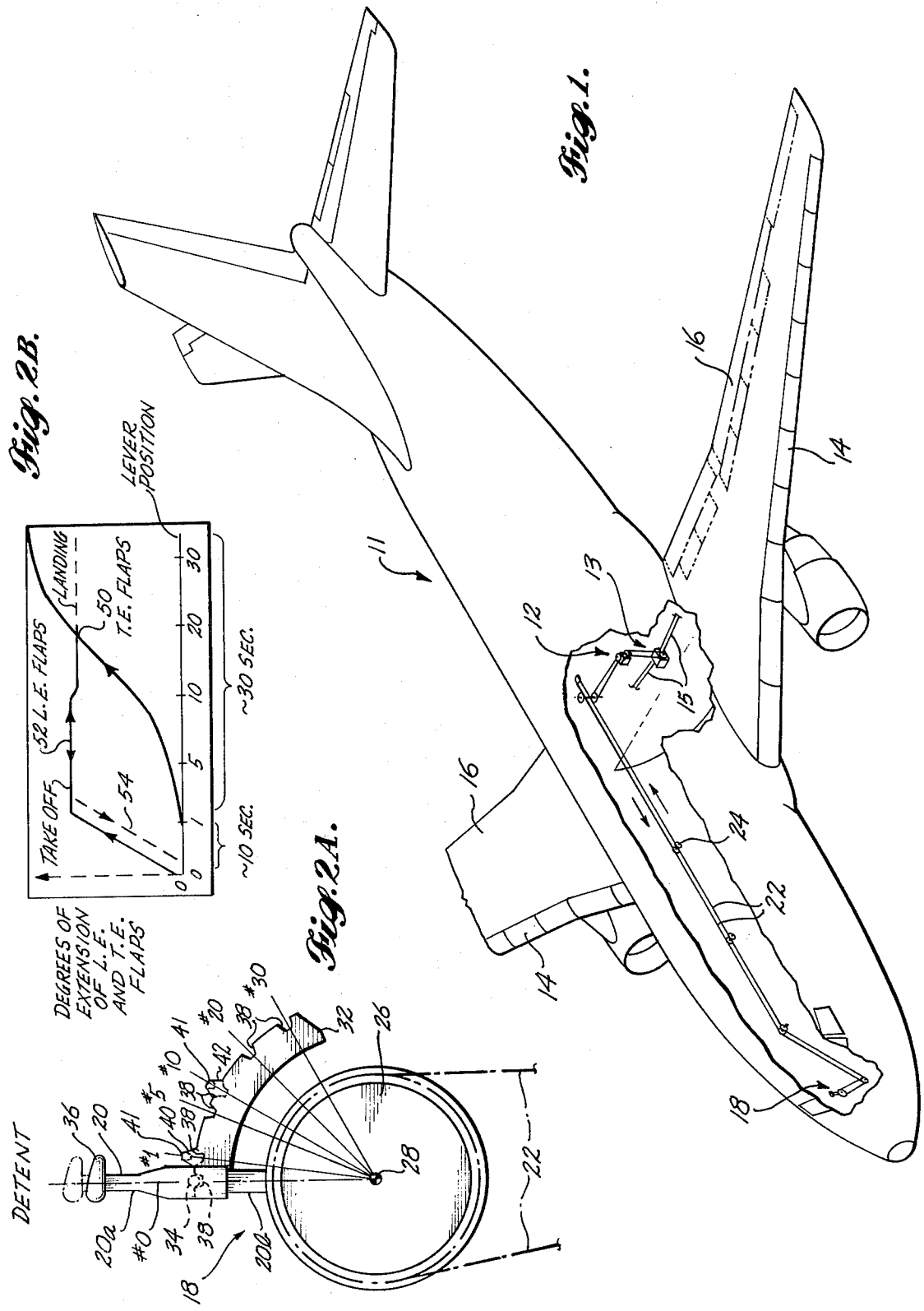

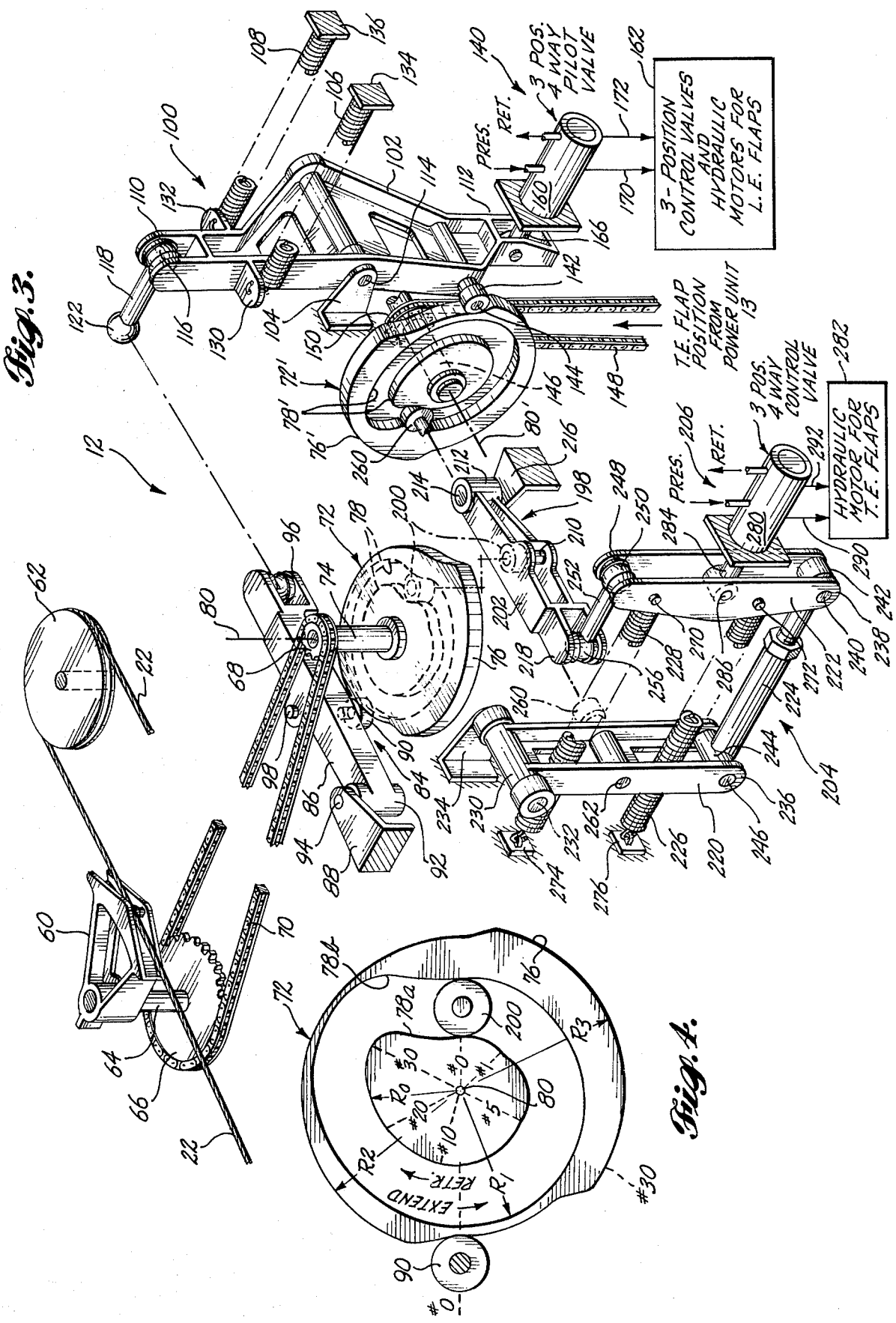

DUAL CAM CONTROL MECHANISM FOR COORDINATED DEPLOYMENT AND RETRACTION OF AN AIR-CRAFT'S LEADING AND TRAILING EDGE WING FLAPS

BACKGROUND OF THE INVENTION

The invention generally relates to mechanisms for positioning airfoils movably mounted on the wings of an aircraft and more particularly, to mechanisms for controlling the sequence of deployment and retraction of leading edge and trailing edge flaps in response to a single, pilot operated flap control lever.

The sequence of deployment and retraction of leading edge flaps and trailing edge flaps is normally coordinated in a predetermined manner to effect certain predictable aerodynamic reactions. These reactions are in turn designed to cause the desired flight performance of the aircraft, and to prevent certain undesired airfoil configurations that result from particular combinations of relative positions of the leading and trailing edge flaps. These aerodynamic design considerations will vary from aircraft to aircraft depending upon such parameters as the body style, number of engines, weight carrying capability, etc. For example, on the current three and four engine Boeing aircraft models, 727's and 747's, respectively, manufactured by The Boeing Company of Seattle, Wash., flap actuation is coordinated so that the leading edge flaps are not extendable until the trailing edge flaps have been extended to or beyond a predetermined degree of deployment. And, during retraction, the trailing edge flaps must be retracted first, at least to a predetermined point, before retraction of the leading edge flaps can commence.

With this particular sequence of flap extension and retraction, a relatively uncomplicated control mechanism can be, and currently is, used to effect the desired positioning of the flaps in response to a single, pilot operated lever. By shifting the control lever to a position commanding flap extension, a cam operated hydraulic subsystem is activated which hydraulically deploys the trailing edge flaps toward the extended position. When the trailing edge flaps reach the above mentioned predetermined point of deployment, another cam operated hydraulic subsystem is activate, which effects deployment of the leading edge flaps toward full extension. The flaps are retracted in a reverse operating sequence in response to movement of the control lever back to a position commanding flap retraction. The trailing edge flaps retract first to the above mentioned point of deployment, at which time the leading edge flaps automatically commence retraction. It is thus seen that the particular extension and retraction sequence of the two sets of flaps lends itself to a relatively simple control system in which the pilot operated lever is in direct control of the trailing edge flaps, and the leading edge flaps are automatically slaved by a hydraulic subsystem to the position of the trailing edge flaps.

However, other models of aircraft, for reasons of airfoil configuration, weight, engine thrust, etc., require a different operating sequence of the leading and trailing edge flaps. In particular, it has been found necessary on certain aircraft to provide for independent deployment of the leading edge flaps, without first deploying the trailing edge flaps. Such prior extension of the leading edge flaps serves to enhance the climb-out capability of the aircraft. By extending the leading edge flaps, without the trailing edge flaps, a greater lift-to-drag ratio is achieved that permits a greater angle of attack, which in turn allows a sharper climb gradient. The result is an improved climb-out performance that is sometimes needed at high altitude airports, to compensate for the lighter air which diminishes the effectiveness of the engine thrust.

Implementation of the leading-edge-only-flap-extension is, however, not easily accomplished. One solution would provide totally separate, independently variable pilot operated control levers, one for each of the leading and trailing edge flaps. This option is, however, not acceptable because of the added pilot workload (a factor which is always minimized to the greatest possible extent) and, most importantly, because of the increased chance of pilot error, under critical flight conditions, when split second coordination of two flap control levers is required.

Another relatively easily implemented solution would be to provide the preferred, single pilot control lever, in which a first portion of the control stroke of the lever serves to position the leading edge flaps only, and the balance of the control stroke serves to actuate the trailing edge flaps. In other words, by maintaining the pilot control lever in the first portion of the control stroke, the pilot would have independent control over the leading edge flaps enabling them to be deployed and retracted without ever actuating the trailing edge flaps. However, this solution, by itself, has also been found deficient because, like the two lever design mentioned above, it puts too much reliance on the ability of the pilot to make the correct control decision under critical and perhaps emergency circumstances.

In particular, consider the case of an emergency go-around. The pilot could, under such circumstances inadvertently move the lever from full leading edge and trailing edge flap deployment, all the way back to the full retract position, thereby immediately commanding full retraction of both leading and trailing edge flaps. Responsively, the hydraulic subsystems that effect the actual positioning of the flaps would commence to simultaneously draw both leading and trailing edge flaps to their fully retracted positions. A slower reaction time of the hydraulically effected movement of the trailing edge flaps, compared to the leading edge flaps, would cause the later to become fully retracted at a time well in advance of full retraction of the former.

Because of aerodynamic considerations, an airfoil configuration on certain aircraft in which the trailing edge flaps remain deployed at a time during which the leading edge flaps are fully retracted, results, at least during emergency go-around conditions, in nonoptimum lift performance. The opportunity to cause such inadvertent movement of the flaps to this particular configuration should be, if at all possible, eliminated.

Accordingly, it is an object of the invention to provide a flap control system, operated in response to a single, pilot controlled lever, that enables a hydraulic subsystem associated with the leading edge flaps to be actuated independently of a hydraulic subsystem associated with the trailing edge flaps, so that the leading edge flaps can be separately deployed while the trailing edge flaps remain retracted; allows concurrent deployment of both leading and trailing edge flaps; and eliminates the opportunity for inadvertently commanding prior retraction of the leading edge flaps before the trailing edge flaps have been hydraulically drawn back into their retracted position.

A related object is to provide such a flap control system that can be readily, and inexpensively retrofitted to existing hydraulic subsystems that are provided for effecting the movement of the flaps in response to a pilot controlled command lever.

SUMMARY OF THE INVENTION

The invention resides in an improvement to an existing flap control mechanism of the type currently provided for coordinating the deployment and retraction of leading and trailing edge flaps in response to a single pilot operated control lever. Such a mechanism includes a primary cam means that is directly responsive to movement of the control lever, and a secondary cam means that is slaved to the actual movement of the trailing edge flaps. The primary cam means has dual cam surfaces, including a leading edge cam surface which acts through a leading edge follower means to control the leading edge flaps and a trailing edge cam surface which acts through a trailing edge follower means to control the trailing edge flaps. These leading and trailing edge follower means in turn operate separate hydraulic subsystems to responsively extend and retract the respective sets of flaps in accordance with pilot commanded movement of the primary cam means. An initial partial displacement of the pilot operated control lever causes the primary cam means and the associated follower means to effect full deployment of the leading edge flaps, without deploying the trailing edge flaps. Further advancement of the control lever beyond a predetermined point, causes the primary cam means together with the associated follower means to deploy the trailing edge flaps in addition to the already deployed leading edge flaps. The existing mechanism also incorporates a secondary cam means that has a cam surface patterned after the trailing edge cam surface of the primary cam means. As the secondary cam means moves in concert with the actual deployment and retraction of the trailing edge flaps, a feedback follower means cooperates with the trailing edge cam surface on the secondary cam means to provide a feedback that is mechanically combined with the response of the trailing edge follower means to the primary cam means, so as to control a hydraulic subsystem that moves the trailing edge flaps to the commanded position.

Now in accordance with the invention, the improvement in the foregoing mechanism comprises an override follower means that cooperates with another cam surface provided on the secondary cam means, which is patterned after the leading edge cam surface on the primary cam means. The primary cam's leading edge follower means and the secondary cam's override follower means cooperate to control the hydraulic subsystem that positions the leading edge flaps. In particular, the hydraulic subsystem for the leading edge flaps is normally operated directly in response to the position commanded by the primary cam's leading edge follower means, but this direct control relationship is overridden by the override follower means when the actual position of the trailing edge flaps dictates a different position of the leading edge flaps than that commanded by the primary cam. The override control of the leading edge flaps is provided so that during a retraction sequence, the leading edge flaps cannot be retracted until the trailing edge flaps have been hydraulically retracted, fully or at least to a predetermined degree, irrespective of the control lever position. The override capability allows a single lever to effect separate control over the deployment of the leading edge flaps for enhancing the aircraft's lift performance during certain flight conditions, and precludes the possibility of an undesirable flap configuration that might result from inadvertent, premature retraction of the leading edge flaps while the trailing edge flaps remain extended.

To provide a complete disclosure of the invention, reference is made to the appended drawings and following description of one particular and preferred embodiment.

BRIEF DESCRIPTION OF THE DRAWINGS

FIG. 1 is an isometric view of an aircraft equipped with leading and trailing edge flaps and a flap control system (shown in the broken away portion of the FIGURE) incorporating the principles of the invention.

FIG. 2a is a detailed view of the pilot operated flap positioning lever located in the cockpit.

FIG. 2b is a graph showing the relative degrees of extension of the leading and trailing edge flaps plotted against the position of the pilot operated control lever of FIG. 2a.

FIG. 3 is a composite schematic and exploded isometric view of the cam mechanisms and associated hydraulic subsystems of the flap control system that are responsive to the position of the control lever shown in FIG. 2.

FIG. 4 is a detailed view of one of the cams, and associated followers employed in the mechanism of FIG. 3.

DETAILED DESCRIPTION

With reference to FIG. 1, an aircraft 11 is equipped with a dual cam control mechanism 12, constructed in accordance with the invention. Mechanism 12 acts through a series of hydraulic devices (described herein) to deploy and retract the leading edge flaps 14, and acts via a hydraulic motor power unit 13 located beneath mechanism 12 to deploy and retract the trailing edge flaps 16. The sequence of movements of both sets of flaps 14 and 16 is coordinated by control mechanism 12 in response to commands from a single, pilot operated control 18. As shown in FIG. 2a, control 18 includes a hand operated lever 20, that is movable between various detent positions. The lever position is in turn communicated to cam mechanism 12 via a control cable 22 and associated guides 24 as depicted in FIG. 1. Power unit 13 is mounted in the wheel well below mechanism 12 and includes a hydraulic motor (not specifically shown) and associated torque tubes 15 which extend laterally outwardly from opposite sides of unit 13 to trailing edge flap actuating mechanisms (not shown) on each of the wings.

As shown in FIG. 2a, lever 20 is affixed to a pulley 26 which in turn is journaled for rotation about a horizontal axis 28. Cable 22 is wrapped around pulley 26 so that cable 22 is responsive to the rotation of pulley 26 effected by movement of lever 20 between a series of detented positions 0, 1, 5, 10, 20 and 30. An arcuate-shaped member 32 is fixedly mounted relative to the movable lever 20 and pulley 26 and is provided with a series of detent notches 38, one for each of the above mentioned lever positions. More particularly, lever 20 is formed in two parts including an upper lever part 20a having a handle 36 at the upper end thereof and having a transversely outwardly projecting pin 34 at the lower end thereof, and a lower lever part 20b onto which part 20a is slidably mounted, along the lengthwise direction of lever 20. A spring bias (not shown) is provided for continuously urging upper lever portion 20a downwardly relative to portion 20b so as to cause pin 34 to seat positively in one of the detent notches 38 provided along member 32.

The detents at positions 1 and 10 are formed with gates 40 and 42, respectively, each of which has a downwardly projecting lug 41, overlying the associated notch 38 for cooperating with pin 34 so that lugs 41 on each of gates 40 and 42 interrupt an otherwise continuous movement of lever 20 past these positions. Lugs 41 force pin 34 down into seated relation with the associated notch 38 causing the lever to pause at detent positions 1 and 10. Thus, gates 40 and 42 provide obstructions along member 32 which require the pilot to make a conscious manipulation of lever portion 20a by means of handle 36 in order to move lever 20 past these positions.

In FIG. 2b, line 50 traces out the degree of extension of the trailing edge flaps as a function of the position of pilot operated lever 20. Similarly, the solid line 52 plots the degree of extension of leading edge flaps 14 as a function of lever position, and the dotted line segment 54 illustrates the timing of the retraction of the leading edge flaps when lever 20 is moved rapidly and directly from any detent position of 5 or greater to 0 (commanding full retraction). As indicated by the bracketed time intervals below the horizontal axis that shows the lever positions, the leading edge flaps 14 will move from full extension to full retraction in approximately 10 seconds in response to movement of control lever 20 from position 1 or greater to position 0. Whereas, the retraction of the trailing edge flaps 16 from full extension to full retraction is comparatively slower and takes appreciably longer (approximately 30 seconds). As discussed more fully hereinafter, these time periods represent the intervals required for the hydraulic subsystems to effect the actual movement of the flaps in response to the commanded positions that are determined by lever 20 of mechanism 18.

With reference to FIG. 3, the dual cam mechanism 12 that incorporates the invention, is shown to include the principal components of a primary cam 72 which acts through a leading edge follower assembly 84 and a rocker arm assembly 100 to control a leading edge hydraulic subsystem 140; and which also acts through trailing edge follower assembly 198 and a summing linkage assembly 204 to control a trailing edge hydraulic subsystem 206. A secondary cam 72' rotatably slaved to power unit 13 which determines the actual position of the trailing edge flaps at any instant. Cam 72' acts through a feedback follower 260 to assist assemblies 198 and 204 in controlling the trailing edge hydraulic subsystem 206; and as modified in accordance with the invention, cam 72' also acts through an override follower 142 to override the response of rocker arm assembly 100 to the leading edge follower assembly 84 whenever an attempt is made to retract the leading edge flaps prior to retraction of the trailing edge flaps.

Now more particularly, the pilot commanded position signal is transmitted to mechanism 12 by means of cable 22 acting on a crank arm 60 located adjacent a terminal pulley 62 about which cable 22 passes on its return reach back to lever mechanism 18 in the cockpit. A vertically oriented shaft 64 transmits the position of crank arm 60 to a sprocket wheel 66 which is mechanically linked to a second sprocket wheel 68 by means of a chain 70.

Primary cam 72 is fixedly mounted to the lower end of a vertically oriented shaft 74 which is journaled for rotation in a bearing assembly (omitted for the purpose of clarity). Sprocket wheel 68 is affixed to the upper end of shaft 74 so that primary cam 72 is rotated in reaction to the pilot commanded movement of cable 22 via crank arm 60, sprocket wheel 66 and 68 and chain 70. Cam 72 has a body that is roughly disc-shaped, and is attached to shaft 74 so that the axis of rotation of cam 72 lies generally centrally of the cam body. Dual cam surfaces are provided on the disc-shaped body of cam 72, including a first camming surface 76 provided about the outer peripheral edge of cam 72, and an interior camming surface 78 in the form of a channel-shaped recess that is cut into the lower face of cam 72 (as viewed in FIG. 3) and that extends eccentrically about the axis 80 of rotation of the cam. As best shown in FIG. 4 and as described in greater detail hereinafter, camming surface 78 is actually two surfaces including a radially inner surface 78a and another surface 78b of conforming shape but located equidistantly and radially outward of surface 78a provided so as to receive and captivate a follower element between surfaces 78a and 78b.

A leading edge follower assembly 84 cooperates with the outer camming surface 76 of cam 72, and for this purpose includes a pivotally mounted lever arm 86, a support bracket 88 and a roller follower 90. An end 92 of arm 86 is connected by a pivot pin 94 to bracket 88 which in turn is fixedly mounted to a stationary support (omitted for clarity) so that the opposite end 96 of the arm is swingable in a horizontal plane lying adjacent to cam 72. Approximately midway between ends 92 and 96, roller follower 90 is rotatably mounted to arm 86 by a vertically oriented pin 98 so as to locate follower 90 beneath the plane of articulation of arm 86 and in the horizontal plane of cam 72. In this manner, follower 90 is disposed so as to ride in contact with the outer peripheral camming surface 76 of cam 72 as the latter is selectively rotated.

Linked to follower arm assembly 84 is a valve actuating rocker arm assembly 100 including a rocker arm 102, pivot support brackets 104 (only one of which is visible in the drawings), and a pair of biasing springs 106 and 108. Arm 102 is pivotally mounted approximately midway between its upper and lower ends 110 and 112, respectively, by a horizontally disposed pivot pin 114 held at its opposite ends by brackets 104 which are in turn fixedly mounted to a stationary support (omitted for clarity). Thusly mounted, arm 102 rotates, through a limited arc, in a generally vertically defined plane.

A universal interconnect link 118 joins end 96 of follower arm 86 with the upper end 110 of rocker arm 102 to accommodate the necessary degrees of freedom in the relative swinging movements of arms 86 and 102. For this purpose, upper end 110 of arm 102 is provided with a socket for receiving a ball-shaped end 116 of link 118; and an opposite ball-shaped end 122 of link 118 is joined to a cooperating socket formed at end 96 of follower 86.

Springs 106 and 108 of assembly 100 are mounted in tension between lugs 130 and 132 and brackets 134 and 136, respectively, which brackets are in turn affixed to a stationary support (not shown). The location of lugs 130 and 132 on arm 102 between pivot pin 114 and the upper end 110 of the arm, and the direction of tension in springs 106 and 108, serve as a biasing means that forces arm 102 to rotate in a direction that urges arm 86 and the associated follower 90 toward and against the peripheral camming surface 76 of cam 72. Such arrangement holds roller follower 90 snugly against the contoured camming surface 76 so that the follower and associated arm 86 move toward and away from the cam axis 80, following the contour of surface 76, as cam 72 is selectively rotated. This movement of arm 86 is transmitted via rocker arm assembly 100, by means of a commensurate movement of the lower end 112 of arm 102, to a hydraulic subsystem 140 that responsively positions the leading edge flaps.

As described more fully hereinafter, the normal response of rocker arm 102 to follower arm 86, follower 90 and cam 72, is under certain conditions, overridden by an override follower 142 that coacts with an outer peripheral surface 76' of a secondary cam 72'. Follower 142 is a roller having a construction similar to that of follower 90 and is rotatively mounted to rocker arm 102 by a horizontally disposed pin 144, transversely arranged on arm 102 at a location intermediate the principal pivot pin 114 and the lower end 112 of arm 102.

Secondary cam 72' is mounted on a horizontally disposed shaft 146 for rotation about a horizontal axis 80', and such rotation of cam 72' is slaved via power unit 13 to the actual, instantaneous position of the trailing edge flaps. Such flaps position is transmitted from power unit 13 (FIG. 1) upwardly to mechanism 12 via a chain 148 to a cooperating sprocket wheel 150, mounted in driving relationship on shaft 146.

Hydraulic subsystem 140 serves to move the leading edge flaps to one of three possible, pilot selected, discrete positions. These three positions are illustrated in FIG. 2b as a retracted position (represented by 0 degrees of flap extension), a takeoff position (corresponding to maximum extension), and a landing position (in which the leading edge flaps are almost fully extended). The latter position is sometimes referred to as the "gapped" position. To displace the leading edge flaps to one of these three positions, hydraulic subsystem 140 includes a three-position, four-way pilot valve 160 that is physically located with mechanism 12, and a plurality of hydraulic motors and associated control valves 162, which are mounted on the wings adjacent the leading edge flaps. These valves and the associated hydraulic motors are conventional and are thus only schematically illustrated. Valve 160 is supplied by pressurized (Pres.) and return (Ret.) hydraulic fluid lines and is mounted to a stationary support (omitted for clarity) so that a movable plunger 166 of valve 160 is selectively displaced by the movement of the lower end 112 of rocker arm 102. As described more fully hereinafter, follower arm 86 and follower 90 respond to three discretely different radii of surface 76 on cam 72, to act through rocker arm assembly 100 to selectively move plunger 166 to one of three discretely different positions within the casing of valve 160. These three positions of valve 160 function through fluid conducting pilot lines 170 and 172 to jointly pilot the three-position control valves and associated motors 162 of subsystem 140 so as to to cause the leading edge flaps to assume one of three possible positions, i.e., retracted, fully extended and "gapped" extended.

The trailing edge flaps are actuated in response to a follower arm assembly 198 mounting a roller follower 200 and cooperating with interior camming surface 78 of primary cam 72. Follower 200 is mounted on a follower arm 202 of assembly 198 that acts through a mechanical summing linkage assembly 204 and a trailing edge hydraulic subsystem 206 to hydraulically position the left hand and right hand trailing edge flaps.

Follower 200 is a roller-type follower, similar to follower 90, and is rotatively mounted on a pin 210 carried by arm 202 so that follower 200 projects above the upper surface of the horizontally oriented arm 202 and rotates relative thereto, about a vertically oriented axis. When the mechanism is assembled, follower 200 fits into and is held captive within the channel-shaped recess that is formed in the lower face of primary cam 72 and that defines the radially opposed surfaces 78a and 78b which constitute camming surface 78.

Arm 202 is itself pivotally mounted at an end 212 by a vertically disposed pivot pin 214 which in turn is held by a pivot support bracket 216. Bracket 216 is affixed to a stationary support (omitted in the drawings for clarity). Thusly mounted, arm 202 is swingable in a horizontal plane such that when follower 200 coacts with surface 78 of cam 72, arm 202 and in particular, the end 218 thereof that lies opposite the pivotally mounted end 212, moves in a horizontal arc toward and away from cam axis 80 as follower 200 traces the eccentric contours of surfaces 78a and 78b.

Summing linkage assembly 204, which is shown to include first and second, spaced parallel links 220 and 222, an interconnecting, length adjustable link 224, and a pair of biasing springs 226 and 228, is arranged to receive on mechanical signal input from follower arm 202. Link 220 of assembly 204 has an upper end 230 journaled for rotation on a horizontally disposed pivot pin 232 which in turn is affixed to a pivot support bracket 234 that is anchored to a stationary support (omitted in the drawings for clarity). A lower bifurcated end 236 of link 220 is thus swingable through a limited arc in a generally vertically defined plane. Link 222, being generally parallel to and spaced from link 220, has a lower end 238 that is bifurcated and pivotally connected to an adjacent end 242 of adjustable link 224. The opposite end 244 of link 224 is similarly, pivotally connected to the bifurcated lower end 236 of link 220 by a transverse pin 246 such that the lower ends 236 and 238 of links 220 and 222, respectively, are swingable in concert in the above mentioned vertically defined plane.

An upper end 248 of link 222 is formed with a socket for receiving a ball-shaped end 250 of an interconnect 252. The opposite ball-shaped end 256 of interconnect link 252 is joined to a socket provided at end 218 of follower arm 202. The result is a universal linkage between follower arm 202 and link 222 that accommodates the arcuate path of arm end 218 in a horizontal plane, and the arcuate path of link end 248 in the vertical plane. Arm 202 thus pivots link 222 about pin 240, causing the upper end 248 of link 222 to be displaced forwardly and rearwardly, as viewed in FIG. 3, as follower 200 reacts to the rotation of cam 72.

At a point on link 220 approximately midway between ends 230 and 236 thereof, a feedback follower 260 is rotatively mounted on a transversely extending pin 262, oriented so as to project transversely outwardly from link 220 for cooperating with the channel-shaped, interior camming surface 78' of secondary cam 72'. In the exploded view of FIG. 3, follower 260 is shown by a solid line position, cooperating directly with camming surface 78' of cam 72' and is also shown in its assembled position by dotted lines adjacent link 220. When the mechanism is in its assembled form, secondary cam 72' will be in immediate juxtaposition to link 220 and beneath follower arm 202.

Follower 260 reacts to the rotation of secondary cam 72', which as mentioned above is slaved to the actual position of the trailing edge flaps, to displace link 220 in a limited vertically oriented arc that in turn causes the lower end of link 236 to move rearwardly and forwardly, as viewed in FIG. 3. Adjustable link 224, moving in concert with end 236 of link 220, thus effects a corresponding rearward and forward movement of the lower pivoted end 238 of link 222.

The combined reaction of the upper end 248 of link 222 to follower arm 202, and of the reaction of lower end 238 of link 222 to follower 260 and link 220, results in a mechanical summation of the cam-follower outputs represented by follower 200 coacting with cam 72, and feedback follower 260 coacting with cam 72'. As described more fully hereinafter, the movement of follower 200, arm 202 and the responsive displacement of link 222, causes hydraulic subsystem 206 to hydraulically commence extension or retraction of the trailing edge flaps. Such extension or retraction of the trailing edge flaps continues until a mechanical feedback signal represented by the position of follower 260 (serving as an error signal in a feedback control system), displaces link 220, and thus the lower end 238 of link 222, sufficiently to cancel out the initial actuation of hydraulic subsystem 206 by link 222 acting in response to arm 202 and follower 200. Thereupon, the trailing edge flaps stop at the commanded position.

Springs 226 and 228 extend horizontally between upper and lower points of attachment 270 and 272 on link 222 and anchor brackets 274 and 276, located rearwardly of link 220 as viewed in FIG. 3. Brackets 274 and 276 are affixed to a stationary support (omitted for clarity of the drawing). Springs 226 and 228 are in tension and serve to maintain a positive bias on link 220 urging both the upper and lower ends 248 and 238 rearwardly against the counteracting effects of links 252 and 224 which tend to push these respective ends of link 222 forwardly as viewed in FIG. 3.

Hydraulic subsystem 206 includes a three-position, four-way control valve 280 plysically mounted with mechanism 12 and a hydraulic motor 282 mounted in power unit 13 and coupled to torque tubes 15 that actuate the trailing edge flaps (FIG. 1). Valve 280 has a movable plunger 284 that is pivotally connected to a transverse pin 286 located on link 222 approximately midway between the lower end 238 and upper end 248. Plunger 284 is reciprocated toward and away from a casing valve 280 which is affixed to a stationary support (omitted for clarity of the drawing) in response to displacement of link 220 by arm 202 and/or link 220. Valve 280 responds to the displacement of plunger 284 by selectively connecting a pressurized hydraulic fluid (Pres.), and a return line (Ret.), for such fluid to output lines 290 and 292 which are connected to drive motor 282 so as to extend and retract the trailing edge flaps depending on the position of plunger 284 of valve 280.

Summing linkage 204 acts in the following manner to cause motor 282 to be selectively operated by valve 280 to drive the trailing edge flaps to the commanded position. Assume that the trailing edge flaps are in their fully retracted position. A pilot moves lever 20 to position 10 (FIG. 2a) causing correlative rotation of cam 72, and displacement of follower 200. Follower arm 202 responds by rotating end 218 forwardly as viewed in FIG. 3 of the drawings, which in turn displaces the upper end 248 of link 222 forwardly, pushing plunger 284 inwardly of the casing of valve 280. At this stage, pivot pin 240 at the lower end of link 222 is stationary. Valve 280 responds to the inward displacement of plunger 284 and connects the pressurized fluid to the extend line output 290 and the return line to the retract output line 292, driving motor 282 in a direction of rotation that effects extension of the trailing edge flaps. The amount of extension is determined by the amount of radial displacement of follower 200 which in turn is determined by the pilot commanded position of lever 20 of mechanism 18 (FIG. 2a). As the trailing edge flaps begin to extend, chain 148 from power unit 13 moves to rotate secondary cam 72' which in turn displaces follower 260 radially outwardly with respect to axis 80'. Link 220 of assembly 204 responds to the displacement of follower 260 and rotates the lower end 236 of the link rearwardly as viewed in FIG. 3, forcing lower end 238 of link 222 rearwardly by a commensurate amount. Since the upper end 248 of link 222 is now stationary inasmuch as cam 72 has stopped its rotation, fixing the position of follower 200. Thus the midpoint of link 222 is displaced rearwardly by a proportional amount, pulling plunger 284 away from the casing of valve 280, closing the previously opened fluid channels that charged output line 290 and vented output line 292. The hydraulic pressure ouput lines 290 and 292 are thereby equalized and the displacement of motor 282 ceases, leaving the trailing edge flaps at a degree of extension determined by the pilot commanded rotation of cam 72 and the correlative displacement of follower 200.

The shapes of primary cam 72 and secondary cam 72' are matched. Thus the showing of cam 72 in FIG. 4 and the following description will suffice for both cams. Cam 72 is shown in FIG. 4 in an angle of rotation relative to followers 90 and 200 corresponding to a condition of full retraction of both the leading and trailing edge flaps, and thus corresponding to position 0 of the pilot control lever 20 (FIG. 2a). To extend the flaps, cam 72 is rotated counterclockwise as viewed in FIG. 4. As marked about the outer perimeter of cam 72, control lever positions 1, 10 and 30 mark the approximate location of follower 90 on camming surface 76 as cam 72 is rotated to these positions by successive advancement of pilot control lever 20 to these corresponding flap control positions. Similarly, the position of follower 200 relative to surface 78a is indicated by the positions 1, 5, 10, 20 and 30 marked on the interior part of cam 72 in FIG. 4, as lever 20 of FIG. 2a is moved in succession to each of these selector positions. It is observed that since follower 200 is diametrically opposed to follower 90 with respect to the axis 80 of rotation of cam 72, the indicated positions 1, 5, 10, etc. of follower 200 on surface 78a are shifted by 180° from the corresponding positions 1, 5, 10, etc., of follower 90 marked adjacent peripheral surface 76.

As described more fully hereinafter, the contouring of peripheral surface 76 of cam 72 is such that in its position 0 of rotation, follower 90 lies at a radius $R_1$, and is displaced, in discrete steps to increasingly larger radii of $R_2$ and $R_3$ as cam 72 is rotated from position 0 through position 30. On the other hand, follower 200 is displaced according to a radius $R_o$ that is constant between the positions 0 and 1 and then begins increasing continuously in a helical pattern from position 1 to a maximum magnitude of $R_o$ max. at position 30.

The shape of secondary cam 72', as mentioned above, is matched to the shape of primary cam 72, and is arranged with respect to followers 142 and 260, so that when the trailing edge flaps are in their fully retracted position, followers 142 and 260 assume the same angular positions as shown for followers 90 and 200 when in the position 0 depicted in FIG. 4. From this initial angular state, secondary cam 72' rotates relative to followers 142 and 260 as a function of the degree of deployment of the trailing edge flaps, in the same correlative manner that the primary cam 72 rotates relative to followers 90 and 200 as a function of the desired degree of flap deployment, selected by lever 20 and plotted in the graph in FIG. 2b.

Operation

With reference to FIGS. 2a, 2b, 3 and 4, it is assumed that the pilot is preparing for takeoff and that the leading and trailing edge flaps are all in their fully retracted positions. To boost the takeoff lift performance, the pilot, using handle 36, moves lever 20 of control 18 from position 0 to position 1. Responsively, cam 72 rotates to the position 1 as shown in FIG. 4, causing follower 90 to be displaced radially outwardly by camming surface 76, in a contoured step from $R_1$ to $R_2$. Follower arm 86 acts through interconnect link 118 to pull the upper end 110 of rocker arm 102 rearwardly (as viewed in FIG. 3) which in turn displaces the lower end 112 of arm 102 forwardly, depressing plunger 166 and thereby displacing valve 160 from a neutral position to a first position of leading edge flap extension. As described above, in this first position of valve 160, hydraulic subsystem 140 acts to hydraulically move the flaps to the maximum degree of extension, depicted in FIG. 2b as the takeoff position of the leading edge flaps.

During the above mentioned sequence, secondary cam 72' and override follower 142 are idle, and follower 142 is simply carried radially away from surface 76' of cam 72' by the movement of rocker arm 102 in response to follower arm 86. Similarly, the components associated with moving the trailing edge flaps are also idle since the radius $R_o$ of camming surface 78a of cam 72 has a constant, minimum dimension between the positions 0 and 1, as shown in FIG. 4. Consequently, follower 200 remains at a constant radius from the axis 80 of cam 72 and follower arm 202 remains stationary. No trailing edge flap movement is initiated, and thus secondary cam 72' also remains stationary.

After takeoff, if the pilot wishes to retract the leading edge flaps, without having caused any extension of the trailing edge flaps, then he simply moves lever 20 from the position 1 back to the position 0, and the above mentioned sequence of operation is simply reversed.

Now assume that the leading edge flaps have been extended to the takeoff position, and lever 20 as shown in FIG. 2a is in position 1. It is now desired to extend the trailing edge flaps, and the pilot moves lever 20 to position 5. Responsively, cam 72 rotates by a predetermined angle, so that follower 200 is now in contact with that region on camming surface 78a of increasing radius $R_o$ as depicted in FIG. 4. Follower 200 is thus displaced radially outwardly by an amount that increases in a continuous fashion as a function of the angle of rotation of cam 72. Follower arm 202 thus is displaced away from cam axis 80 and forwardly as viewed in FIG. 3 and acts via link 252 on the upper end of link 222, forcing plunger 284 of valve 280, inwardly of the valve casing. Hydraulic subsystem 206 which includes valve 280, responds accordingly, and causes motor 282 of power unit 13 to initiate extension of the trailing edge flaps. Such extension continues until the feedback components of the control mechanism provided by cam 72', camming surface 78' and feedback follower 260 act through summing linkage assembly 204 to counteract that displacement of plunger 284 caused by follower 200 and follower arm 202. When the trailing edge flaps reach their commanded position, the summing linkage assembly 204 returns plunger 284 of valve 280 to a neutral position, terminating the hydraulically effected movement of the flaps.

During the foregoing sequence, the outer camming surface 76 of cam 72 has remained at a constant radius $R_2$, such that follower 90 and follower arm 86 remain at a constant distance from cam axis 80. The corresponding surface 76' on secondary cam 72' has now rotated so as to cause the radial dimension corresponding to $R_2$ in FIG. 4 to be in registration with the override follower 142, taking up the above described gap that initially developed between follower 142 and the lesser radius of secondary cam 72'. During such time, rocker arm 102 remains stationary, maintaining hydraulic subsystem 140 in a condition that holds the leading edge flaps in the takeoff configuration.

Now with the leading and trailing edge flaps in the positions defined immediately above, it is assumed that the pilot moves lever 20 in FIG. 2a to position 10. Cam 72 rotates, causing the follower 90 associated with the leading edge flaps to be radially displaced further outwardly from axis 80 by that segment of surface 76 having a radius $R_3$. Follower arm 86, link 118 and rocker arm 102 react by causing pilot valve 160 of hydraulic subsystem 140 to move the leading edge flaps to the landing configuration, which involves a slight retractive motion of the leading edge flaps as illustrated in FIG. 2b. Concurrently, follower 200, associated with the trailing edge flaps, is displaced radially outwardly from axis 80 of cam 72 by the increasing dimension of radius $R_o$ associated with the inner camming surface 78a. The further displacement of follower 200 acts through follower arm 202 and summing linkage assembly 204 to cause hydraulic subsystem 206 to further extend the trailing edge flaps according to the plotted line 50 of FIG. 2b. The ensuing movement of the trailing edge flaps to the position of greater extension, causes a rotation of secondary cam 72' so that the larger radius portion of camming surface 76' (corresponding to radius $R_3$ in FIG. 4) moves into registration with the override follower 142, contacting follower 142 but not causing any displacement thereof.

Similarly, further pilot advancement of lever 20 of control 18 effects additional extension of the trailing edge flaps according to the plotted line 50 in FIG. 2b, while the leading edge flaps remain in the landing configuration.

During a retraction sequence, any hurried movement of control lever 20 by the pilot from a selector position greater than #1 to the fully retracted position 0, brings into play the override function of secondary cam 72' and follower 142 which acts to prevent premature retraction of the leading edge flaps. For example, let it be assumed that the pilot has placed the flaps in a landing configuration in preparation for a landing approach and lever 20 is in any one of selector positions 10, 20 or 30. Suddenly, an emergency go-around maneuver is required, during which the pilot must quickly change from descending flight to climb-out flight. Instinctively, the pilot moves lever 20 so as to retract, as quickly as possible, the trailing edge flaps, and in doing so, inadvertently moves lever 20 all the way to the selector position 0, commanding full retraction of both trailing and leading edge flaps. Without the override feature of the invention provided by camming surface 76' and override follower 142 on secondary cam 72', the control mechanism 12 acting in response to primary cam 72 would cause the hydraulic subsystem 140 for the leading edge flaps to immediately commence their retraction, concurrently with the simultaneously commanded retraction of the trailing edge flaps. If such were to occur, the leading edge flaps, which as indicated in FIG. 2b retract over a timespan of approximately 10 seconds, would complete their full retraction well prior to the retraction of the trailing edge flaps, which as also indicated in FIG. 2b takes approximately 30 seconds, and would cause an unacceptable loss of lift.

However, with the override feature of the invention, the hydraulic retraction of the leading edge flaps under the given conditions is delayed until the trailing flaps are retracted. Such delay is achieved by causing secondary cam 72' and override follower 142 to temporarily override the response of rocker arm 102 to the leading edge follower 90 and the associated primary cam 72. In particular, let it be assumed that the trailing edge flaps are initially in a position of full extension, corresponding to selector lever position 30, and accordingly secondary cam 72' is at an angle of rotation placing override follower 142 at the largest radius of surface 76', corresponding to radius $R_3$ of cam 72 as shown in FIG. 4. Not until cam 72' has been rotated to present a lesser radius of camming surface 76' to override follower 142, will rocker arm 102 be capable of responding to the radially inward movement of follower 90 to surface 76 of cam 72. When the command lever 20 is moved to position 0, the trailing edge flaps must reach a point of substantially full, or at least a predetermined degree of retraction before secondary cam 72' has rotated so as to present the least radius segment, corresponding to $R_1$ in FIG. 4, to the override cam 142, at which point rocker arm 102 is free to respond directly to follower 90 and cam 72.

While only a particular embodiment of the invention has been disclosed herein, it will be readily apparent to persons skilled in the art that numerous changes and modifications can be made thereto without departing from the spirit of the invention.

The embodiments of the invention in which an exclusive property or privilege is claimed are defined as follows:

1. In an apparatus for controlling the leading edge flaps and trailing edge flaps of an aircraft in response to a single, pilot operated control, that has a primary control cam means which cooperates with leading and trailing edge flap follower means for effecting, in response to selective movement of said primary cam means by said pilot operated control, the extension and retraction of the leading and trailing edge flaps, respectively, through leading and trailing edge actuation means, and that further has a secondary cam means which is slaved to the trailing edge flaps for correlative movement therewith and a feedback follower means cooperating with said secondary cam means for providing a mechanical feedback signal which coacts with said trailing edge follower means to cause the trailing edge actuation means to effect the movement of said trailing edge flaps to a position selected by said pilot operated control and said primary cam means, wherein the improvement in said apparatus ensures a predetermined retraction sequence of the leading and trailing edge flaps and comprises:
   additional camming surface means formed on said secondary cam means; and
   override follower means cooperating with said additional camming surface means on said secondary cam means for overriding the reaction of said leading edge actuation means to said leading edge follower means and said primary cam means when said leading edge follower means attempts to cause the leading edge flaps to retract before the trailing edge flaps have retracted, in response to said trailing edge follower means, to at least a predetermined state of retraction.

2. The improvement set forth in claim 1 wherein said primary control cam means includes a first camming surface for cooperating with said leading edge flap follower means, and has a second camming surface for cooperating with said trailing edge flap follower means, and wherein said additional camming surface means on said secondary cam means matches said first camming surface on said primary cam means.

3. The improvement set forth in claim 1 wherein said secondary cam means further includes a second camming surface that has a shape matching said second camming surface of said primary cam means, said feedback follower means cooperating with said second camming surface on said secondary cam means for providing said mechanical feedback signal, and wherein said trailing edge actuation means comprises a hydraulic subsystem means that acts in joint response to said trailing edge follower means and said feedback follower means for causing the extension and retraction of the trailing edge flaps in joint response to selective movement of said primary cam means by said pilot operated control and to said movement of said secondary cam means with the trailing edge flaps.

4. The improvement set forth in claim 1 wherein said leading edge actuation means includes a pivotally mounted arm having one end connected so as to pivotally react to movement of said leading edge follower means caused by said primary cam means, and wherein said secondary cam means comprises a generally disc shaped body mounted for rotation about an axis passing therethrough and wherein said additional camming surface on said secondary cam means is provided on an outer peripheral edge portion of said body, and wherein said override follower means is mounted on said arm so as to move into and out of camming contact with said outer peripheral edge portion of said body of said secondary cam means.

5. The improvement set forth in claim 4 wherein said primary cam means comprises a generally disc shaped body mounted for rotation about an axis passing therethrough and has a first camming surface on an outer peripheral edge portion of said body of said primary cam means, said leading edge flap follower means cooperating with said first camming surface on said body of said primary cam means.

6. The improvement of claim 5 wherein said body of said primary cam means defines a channel shaped recess formed in one face of such body and extending generally circumferentially with respect to the axis of rotation of such body, said channel shaped recess defining a second camming surface of said primary cam means for cooperating with said trailing edge flap follower means, and wherein said body of said secondary cam means has a channel shaped recess defined in one face thereof and extending generally cicumferentially with respect to the axis of rotation of such body, said channel shaped recess in said body of said secondary cam means providing a second camming surface of said secondary cam means for cooperating with said feedback follower means.

7. An apparatus for controlling, in a predetermined sequence, both the leading edge and trailing edge flaps in response to a single, pilot operated control, comprising:
- a primary leading and trailing edge flap control cam means mounted for selective movement in response to said pilot operated control;
- a leading edge follower means cooperating with said primary cam means;
- leading edge actuation means responsive to said leading edge follower means for causing the extension and retraction of the trailing edge flaps in reaction to movement of said primary cam means;
- a trailing edge follower means cooperating with said primary cam means;
- trailing edge actuation means responsive to said trailing edge follower means for causing the extension and retraction of the trailing edge flaps in reaction to said movement of said primary cam means;
- a secondary cam means operatively connected to the trailing edge flaps for correlative movement of said secondary cam means in reaction to the instantaneous positioning of said trailing edge flaps; and
- an override follower means cooperating with said secondary cam means for overriding the response of said leading edge actuation means to said leading edge follower means and said primary cam means when said leading edge follower means and primary cam means attempt to cause the leading edge flaps to retract before the trailing edge flaps have retracted, in response to said trailing edge actuation means, to at least a predetermined state of retraction.

8. The apparatus set forth in claim 7, wherein said primary cam means includes a first camming surface for cooperating with said leading edge flap follower means, and a second camming surface for cooperating with said trailing edge flap follower means, and wherein said secondary cam means includes at least a first camming surface having a shape that matches said first camming surface of said primary cam means, and said first camming surface on said secondary cam means cooperating with said override follower means.

9. The apparatus set forth in claim 8 wherein said secondary cam means further includes a second camming surface that has a shape matching said second camming surface of said primary cam means, and further comprising a feedback follower means cooperating with said second camming surface of said secondary cam means, and wherein said trailing edge actuation means comprises a hydraulic subsystem means that acts in response to said trailing edge follower means and said feedback follower means for causing the extension and retraction of the trailing edge flaps in response to said selective movement of said primary cam means by said pilot operated control and in response to said correlative movement of said secondary cam means.

10. The apparatus of claim 9 wherein said leading edge actuation means includes a pivotally mounted arm having one end connected so as to pivotally react to movement of said leading edge follower means, and wherein said secondary cam means comprises a generally disc shaped body mounted for rotation about an axis passing therethrough and said first camming surface on said secondary cam means is provided on an outer peripheral edge portion of said body, and said override follower means is mounted on said arm so as to move into and out of camming contact with said outer peripheral edge portion of said body of said secondary cam means.

11. The apparatus set forth in claim 10 wherein said primary cam means comprises a generally disc shaped body mounted for rotation about an axis passing therethrough and said first camming surface on said primary cam means is provided on an outer peripheral edge portion of said body of said primary cam means.

12. The apparatus set forth in claim 11 wherein said body providing said secondary cam means has a channel shaped recess provided in one face of such body and extending generally circumferentially with respect to the axis of rotation of such body, and wherein said second camming surface on said secondary cam means is provided by said channel shaped recess.

13. The apparatus set forth in claim 12 wherein the body that provides said primary cam means has a channel shaped recess provided in one face of such body and extending generally circumferentially with respect to the axis of rotation of such body, and said second camming surface of said primary cam means is provided by said channel shaped recess on said body of said primary cam means.

* * * * *